United States Patent [19]

Bering et al.

[11] Patent Number: 4,860,409
[45] Date of Patent: Aug. 29, 1989

[54] MOLDING RETENTION CLIP ASSEMBLY

[75] Inventors: Anton J. Bering, Mt. Clemens; William V. Hildebrandt, Sterling Heights, both of Mich.

[73] Assignee: General Motors Corporation, Detroit, Mich.

[21] Appl. No.: 235,022

[22] Filed: Aug. 1, 1988

[51] Int. Cl.⁴ .................... A44B 21/00; E04F 19/02
[52] U.S. Cl. ........................ 24/289; 24/293; 24/297
[58] Field of Search .............. 24/289, 293, 292, 297, 24/453; 411/508, 510, 84, 340

[56] References Cited

U.S. PATENT DOCUMENTS

| | | | |
|---|---|---|---|
| 3,354,597 | 11/1967 | Meyer | 24/297 |
| 3,373,463 | 3/1968 | Wells | 24/297 |
| 3,445,979 | 5/1969 | Meyer | 52/718 |
| 3,631,569 | 1/1972 | Seckerson et al. | 24/73 |
| 3,703,747 | 11/1972 | Hamman | 24/289 |
| 3,869,760 | 3/1975 | Meyer | 24/73 |
| 3,897,967 | 8/1975 | Barenyi | 24/297 |
| 4,011,635 | 3/1977 | Meyer | 24/293 |
| 4,135,277 | 1/1979 | Taniai et al. | 24/73 |
| 4,698,882 | 10/1987 | Lang | 24/289 |

Primary Examiner—Victor N. Sakran
Attorney, Agent, or Firm—Charles E. Leahy

[57] ABSTRACT

A molding retention clip assembly has a molded plastic base having a planar bottom surface adapted to rest upon the painted surface of the vehicle body and a keyhole slot adapted to fit over a head stud welded to the vehicle body. The headed stud retains the base on the body but permits rotation of the base. A stamped metal spring clip has a base wall overlying the plastic base and attached thereto. First and second retaining clips are integral with the base wall and positioned in spaced apart relation on opposite sides of the keyhole slot of the plastic base. Installation of the molding into the first and second clips causes the clip assembly to rotate so that the first and second clips obtain effective grip of the molding to retain the molding on the vehicle body and the molding in turn retains the clip assembly against rotation. The spring clip is preferably attached to the plastic base by integral projections of the plastic base which extend into aligned apertures of the spring clip base wall for heat staked attachment.

2 Claims, 1 Drawing Sheet

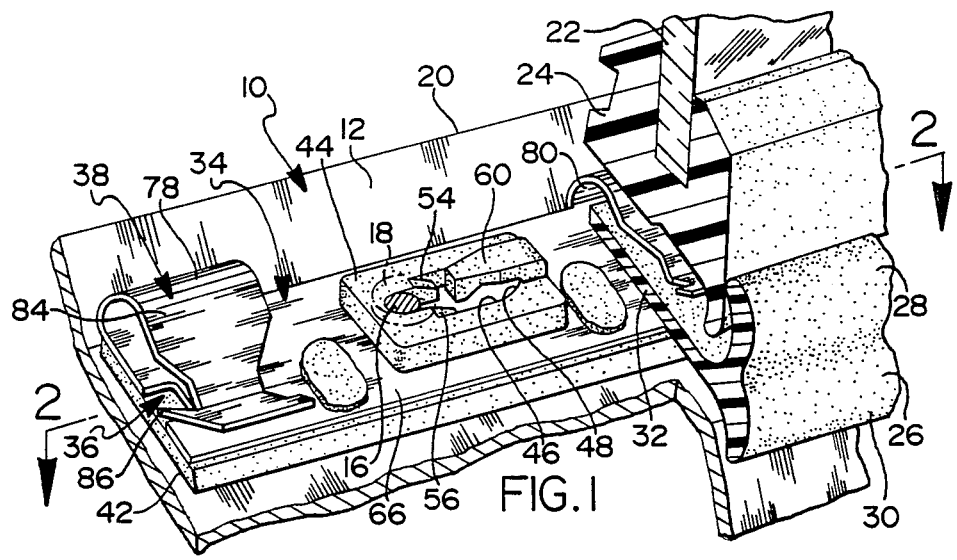
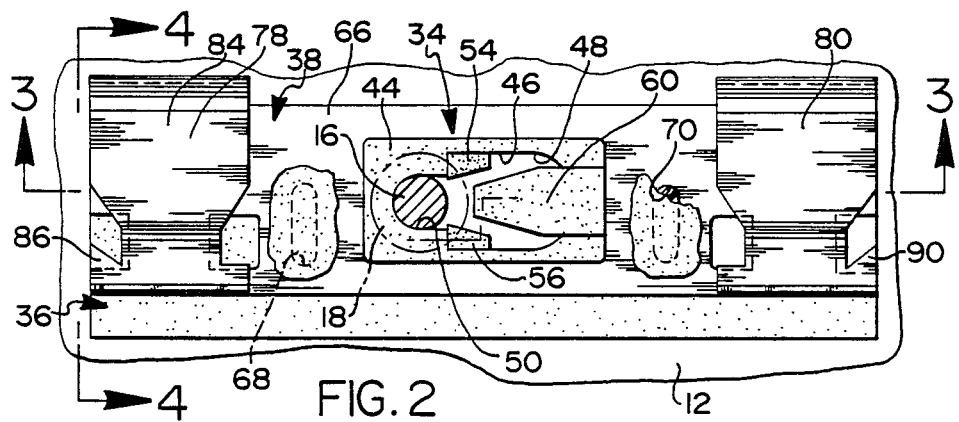
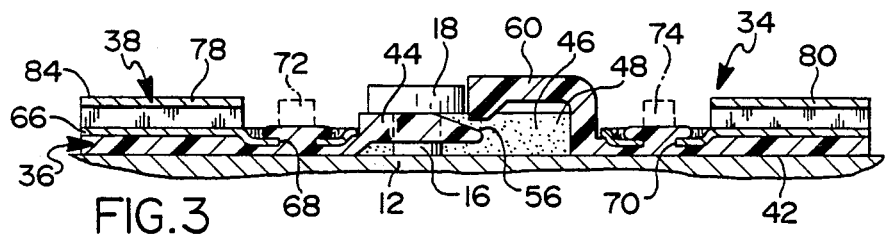
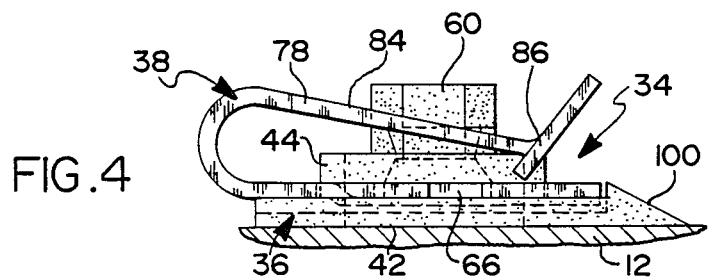

MOLDING RETENTION CLIP ASSEMBLY

The invention relates to a molding clip for retaining a molding on a vehicle body and more particularly a clip assembly which fits on a headed stud.

BACKGROUND OF THE INVENTION

It is known in vehicle bodies to weld a plurality of headed studs onto the vehicle body to permit the subsequent mounting of a molding on the body. The vehicle body and the headed studs are painted prior to the attachment of the molding.

It is known that the use of a metallic clip for attaching the molding to the headed stud may scratch the paint off the stud or the body and lead to corrosion. It is also known that a plastic clip may be used which obviates the corrosion difficulty, however, the plastic clip may not possess the retention characteristics which are provided by a spring steel clip.

Accordingly, it would be desirable to provide a molding retention clip assembly which would attach a molding to a headed stud in a manner which would both prevent corrosion and provide an effective retention of the molding to the vehicle body.

SUMMARY OF THE INVENTION

According to the present invention, a molding retention clip assembly has a molded plastic base having a planar bottom surface adapted to rest upon the painted surface of the vehicle body and a keyhole slot adapted to fit over a headed stud welded to the vehicle body. The headed stud retains the base on the body but permits rotation of the base. A stamped metal spring clip has a base wall overlying the plastic base and attached thereto. First and second retaining clips are integral with the base wall and positioned in spaced apart relation on opposite sides of the keyhole slot of the plastic base. Installation of the molding into the first and second clips causes the clip assembly to rotate so that the first and second clips obtain effective grip of the molding to retain the molding on the vehicle body and the molding in turn retains the clip assembly against rotation. The spring clip is preferably attached to the plastic base by integral projections of the plastic base which extend into aligned apertures of the spring clip base wall for heat staked attachment.

Accordingly, the object, feature and advantage of the invention resides in the provision of a molding retention clip assembly having a plastic base which contacts the vehicle body and grips the headed stud to prevent damage to the paint covering the vehicle body and headed stud.

Another feature, object and advantage resides in the provision of a molding clip having a keyhole slot at the center thereof receiving a headed stud to mount the clip on a vehicle body, and first and second retaining clips spaced laterally each side of the keyhole slot to permit rotation of the clip somewhat during installation of the molding and the installation of the molding in turn prevents the rotation of the clip assembly subsequent to the installation of the molding.

BRIEF DESCRIPTION OF THE DRAWINGS

These and other features, objects and advantages of the invention will become apparent consideration of the description of the preferred embodiment and appended drawings in which:

FIG. 1 is a perspective view of a vehicle body having a molding retention clip assembly of the invention retaining a molding to the vehicle body;

FIG. 2 is a plan view of the molding retention clip assembly taken in the direction of arrows 2—2 of FIG. 1;

FIG. 3 is a sectional view taken through the clip assembly in the direction of arrows 3—3 of FIG. 2; and FIG. 4 is an end view of the clip assembly taken in the direction of the arrows 4—4 of FIG. 2.

DESCRIPTION OF THE PREFERRED EMBODIMENT

Referring to FIG. 1 it is seen that a vehicle body 10 includes a body panel 12 having a headed stud 14 welded thereto. The headed stud 14 includes a shank 16 and a head 18. The body panel 12, together with other body panels defines a window opening 20. A window panel 22 is mounted in the window opening 20 by a molded plastic frame 24.

A window reveal molding 26 is provided to close out the gap between the body panel 12 and the window frame 24. The molding 26 includes first and second legs 28 and 30 which respectively bridge onto the window frame 24 and the body panel 12, and a continuous stem 32 which is adapted to reach into the gap between the body panel 12 and window frame 24 where it is engaged and retained by a molding clip assembly generally indicated at 34. The molding clip assembly 34 is comprised of a molded plastic base 36 and a stamped metal spring clip 38. The plastic base 36 is generally rectangular in shape and has a planar bottom surface 42 which is adapted to rest upon the surface of the body panel 12. The center portion of the plastic clip includes a raised abutment portion 44 having a keyhole shaped slot 46 including an access portion 48 slightly larger in diameter than the head 18 of headed stud 14 and a slot 50 which is slightly larger in diameter than the stem 16 but smaller than the head 18. A pair of cam surfaces 54 and 56 are provided at the juncture between the access portion 48 and the slot 50. A locking tab 60 is integral with the plastic base 42 and overlies the access portion 48.

The spring clip 38 is a sheet metal stamping of spring steel and includes a base wall 66 which overlies the plastic base 36. The base wall 66 overlies the top surface of the plastic base 36 and has a pair of apertures 68 and 70 which receive phantom-line indicated upstanding projections 72 and 74 of the plastic base 36. These projections 72 and 74 are heated with a die and deformed downwardly to provide a heat staked connection of the spring clip 38 to the plastic base 36. The spring clip 38 includes a clip 78 at the left hand end thereof and a clip 80 at the right hand end thereof. These clips are formed integrally with the base 66 and are disposed in spaced apart relation on opposite sides of the keyhole slot 46. As best seen in FIG. 4, the clip 78 is comprised of an arm 84 which is reversely bent to overlie the base 66 and has a retaining tang 86 formed on the end of the arm 84. Clip 80 has a similar retaining tang 90.

As best seen in FIG. 1, the clip assembly 34 is installed onto the headed stud 14 by placing the clip assembly onto the body panel 12 with the access portion 48 of the keyhole slot 46 fitting over the head 18 of the headed stud 14. Then, a suitable tool is used to shift the clip assembly 34 rightwardly so that the spring finger 60 is deflected upwardly to permit the shank 16 to fit within the slot 50. The cam surfaces 54 and 56 facilitate the right hand sliding movement of the molding assembly 34 relative to the headed stud 14. The locking tab 60 then snaps downwardly to engage against the head 18 to retain the molding assembly at its position at which the shank 16 is captured in the slot 50. Accordingly, it will be understood that the molding clip assembly 34 is retained upon the headed stud 14 but the clip assembly may rotate somewhat on the headed stud 14.

The molding 26 is installed by forcing the stem 32 of the molding 26 into the gap between the window frame 24 and the body panel 12. As best seen in FIG. 4, the end wall of the plastic base 36 is tapered at 100 to facilitate the entry of the molding stem 32. The stem 32 has clearance cutouts staggered along its length to slide past the raised abutment portion 44 of the plastic base 36. The stem 32 is captured by the clips 78 and 80 with the retaining tangs 86 and 90 biting into the stem 32. During such installation and insertion of the molding stem 32, the molding clip assembly 34 may rotate somewhat relative to the stem as necessary to obtain an effective grip of the molding by the locking tangs 86 and 90. Once the molding stem 32 is fully installed the gripping action between the stem 32 and the locking tangs 86 and 90 function to retain the clip assembly 34 against rotation relative to the headed stud 14.

Thus it is seen that the invention provides a new and improved clip assembly for retaining a molding on a vehicle body. The plastic base of the clip assembly contacts with the painted metal body panel and the painted headed stud so that the paint is not scratched or chipped which could lead to corrosion. The metallic spring clips tenaciously grip the plastic molding to effectively retain the plastic molding against dislodgement. The mounting of the molding on a single headed stud permits the molding clip to rotate somewhat during installation of the molding to obtain the optimum engagement between the molding and the clip assembly. Once the molding is installed the molding effectively retains the molding clip against further rotation.

The embodiments of the invention in which an exclusive property or privilege is claimed are defined as follows:

1. A molding retention clip assembly adapted to fit on a headed stud projecting from a painted surface of a vehicle body and receive a molding, said clip assembly comprising:

a molded plastic base having a planar bottom surface adapted to rest upon the painted surface of the vehicle body and having a key hole slot in the center thereof adapted to fit over the headed stud to retain the base on the vehicle body and permit rotation of the base relative the vehicle body, a stamped metal spring clip having a base wall overlying the plastic base and attached thereto, and first and second clips integral with the base wall and positioned in spaced apart relation on opposite sides of the key hole slot of the base, whereby the installation of the molding into the first and second clips causes the clip assembly to rotate so that the first and second clips obtain effective grip of the molding to retain the molding on the vehicle body.

2. The clip assembly of claim 1 in which the molded plastic base has projections extending into aligned apertures of the base wall of the spring clip for heat staked attachment of the spring clip to the plastic base.

* * * * *